(12) United States Patent
Tajuddin et al.

(10) Patent No.: US 9,507,882 B1
(45) Date of Patent: Nov. 29, 2016

(54) DECLARATIVE LANGUAGE DYNAMIC WEB PLATFORM

(71) Applicant: AMAZON TECHNOLOGIES, INC., Reno, NV (US)

(72) Inventors: Brian Jaffery Tajuddin, Seattle, WA (US); Jeremy Boynes, Mercer Island, WA (US); Melissa Elaine Davis, Edmonds, WA (US); Adam Lloyd Days, Tacoma, WA (US); Erin Harding Kraemer, Seattle, WA (US); Félix Joseph Étienne Pageau, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 114 days.

(21) Appl. No.: 13/964,742

(22) Filed: Aug. 12, 2013

(51) Int. Cl.
*G06F 17/30* (2006.01)

(52) U.S. Cl.
CPC ............... *G06F 17/30991* (2013.01)

(58) Field of Classification Search
USPC ......................................................... 707/722
See application file for complete search history.

(56) References Cited

U.S. PATENT DOCUMENTS

| | | | | |
|---|---|---|---|---|
| 6,604,100 | B1* | 8/2003 | Fernandez | G06F 17/2247 |
| 7,221,377 | B1* | 5/2007 | Okita et al. | 345/629 |
| 2006/0074730 | A1* | 4/2006 | Shukla et al. | 705/8 |
| 2006/0074734 | A1* | 4/2006 | Shukla et al. | 705/8 |
| 2007/0220022 | A1* | 9/2007 | Lankinen et al. | 707/101 |
| 2008/0120348 | A1* | 5/2008 | Field | G06F 8/31 |
| 2009/0235230 | A1* | 9/2009 | Lucas et al. | 717/108 |
| 2009/0276479 | A1* | 11/2009 | Lucas et al. | 709/201 |
| 2010/0023852 | A1* | 1/2010 | Chou | G06F 17/2247 715/234 |
| 2011/0191407 | A1* | 8/2011 | Fu | G06F 8/38 709/203 |
| 2011/0307857 | A1* | 12/2011 | Lucas et al. | 717/104 |
| 2013/0173539 | A1* | 7/2013 | Gilder et al. | 707/622 |
| 2014/0351684 | A1* | 11/2014 | Smit | G06Q 10/06 715/222 |

OTHER PUBLICATIONS

Papazoglou, Michael P., "Web Services and Business Transactions", World Wide Web, vol. 6, Issue 1, Mar. 2003, pp. 49-91.*
Rosenberg, Florian, et al., "Business Rules Integration in BPEL—A Service-Oriented Approach", CEC '05, Munich, Germany, Jul. 19-22, 2005, pp. 476-479.*
Hemel, Zef, et al., "Declaratively Programming in the Mobile Web with Mobl", OOPSLA'11, Portland, OR, Oct. 22-27, 2011, pp. 695-712.*
Glatard, Tristan, et al., "A Service-Oriented Architecture enabling dynamic service grouping for optimizing distributed workflow", Future Generation Computer Systems, vol. 24, Elsevier, © 2008, pp. 720-730.*

(Continued)

*Primary Examiner* — Robert Stevens
(74) *Attorney, Agent, or Firm* — Lindauer Law, PLLC

(57) ABSTRACT

Described is a dynamic web platform configured to provide content rendered with one or more rendering systems. The rendering systems and the modules making up the rendering modules may interact with one another by way of declarative data. Administrators may configure the platform using the declarative data. The declarative data may express operational parameters, business rules, and so forth and may be modified while the platform is operating. The modules in the rendering system may be loosely bound, allowing for concurrent operations, dynamic changes to what content is to be rendered, and so forth.

20 Claims, 9 Drawing Sheets

(56) References Cited

OTHER PUBLICATIONS

Goldsack, Patrick, et al., "SmartFrog and Data Centre Automation", HPL-2008-35, HP Laboratories, Bristol, UK, © 2008, pp. 367-375.*

Meltzer, Bart, et al., "XML and Electronic Commerce: Enabling the Network Economy", SIGMOD Record, vol. 27, No. 4, @ 1998, pp. 21-24.*

Klein, Felix, et al., "Xflow—Declarative Data Processing for the Web", Web3D 2012, Los Angeles, CA, Aug. 4-5, 2012, pp. 37-45.*

Ponnekanti, Shankar R., et al., "Application-Service Interoperation without Standardized Service Interfaces", PerCom 2003, Fort Worth, TX, Mar. 26, 2003, pp. 30-37.*

Alsubaiee, Sattam, et al., "Asterix: Scalable Warehouse-Style Data Integration", IIWeb '12, Scottsdale, AZ, May 20, 2012, Article No. 2, pp. 1-4.*

Amundsen, Mike, "From APIs to Affordances: A New Paradigm for Web Services", WS-REST 2012, Lyon, France, Apr. 2012, pp. 53-60.*

* cited by examiner

DECLARATIVE LANGUAGE DYNAMIC WEB PLATFORM

BACKGROUND

Users use client devices to access a wide variety of content from online providers. This content may be associated with various endeavors such as ecommerce, communication, medicine, education, and so forth.

Figure 1:
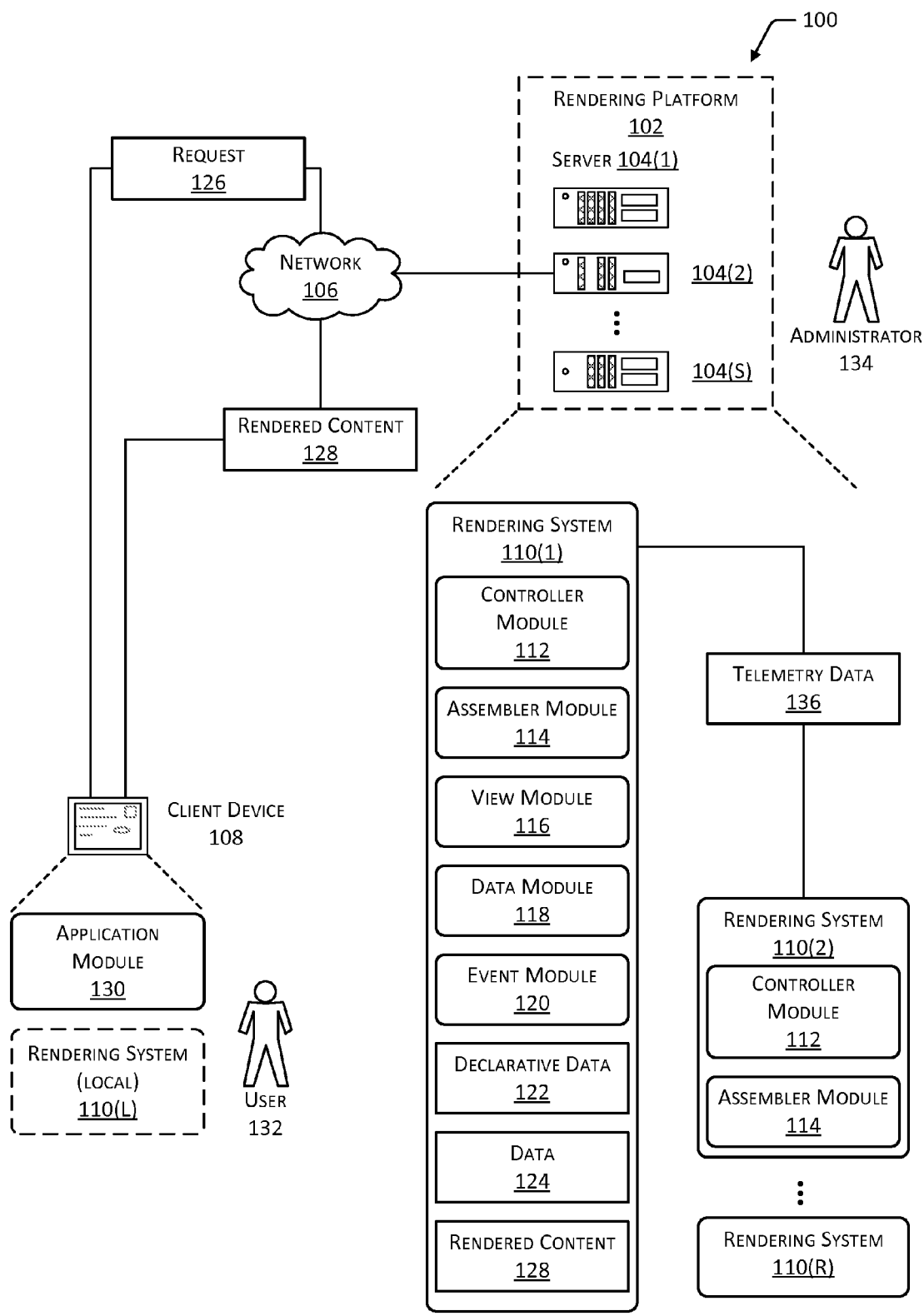
FIG. 1 is an architecture including a dynamic web platform with a rendering system configured to generate rendered content using declarative data configured to control a controller module.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Users may use client devices to access a wide variety of content available from online resources. The content may support various endeavors such as ecommerce, communication, medicine, education, and so forth. The content may be expressed as web pages which are rendered in a markup language for presentation by the client devices.

The content may be customized to provide information which is specific to a particular user or group of users. Traditional dynamic web platforms may include one or more servers which are configured to access various pieces of data and render content for delivery to the client device.

These traditional platforms may use many different modules to provide the various functions associated with rendering the content. These modules may provide functionality such as accessing data, generating views, controlling the functionality, and so forth. In these traditional platforms, these modules are tightly bound to one another, with the binding expressed in program code.

Modules which are tightly bound to one another are closely interconnected. As a result, changes to one may impact another. Tight binding may be expressed as a condition where modules are interconnected more than necessary to function. For example, a first module may be considered tightly bound when the first module requests all fields in a table from a second module, when only one of those fields is actually used by the first module.

In comparison, loosely bound modules are less interconnected. Changes to one module need not impact another module. As a result, the loosely bound modules may be expressed as being interconnected just enough to function. Continuing the example, when the first module is loosely bound to the second module the first module requests from the table only the single field actually used. Other changes to the table in the second module, such as adding fields, would not adversely impact the operation of the first module.

By loosening the binding between modules, various benefits may be realized. Some functions in the modules may be performed concurrently, reducing overall elapsed time to deliver rendered content. Changes to one module are less likely to impact other modules, reducing development, deployment complexity, and costs.

Described in this disclosure is a dynamic web platform which incorporates a declarative language and corresponding declarative data to configure interactions between loosely bound modules. The declarative language is consistent across the platform, allowing for ease of development, deployment, and maintenance. The declarative data may express operational parameters, business rules, and so forth. For example, the declarative data may specify uniform resource locators ("URLs") which are supported by the platform, information about what content to present, how to interact with a user, and so forth.

The platform is made up of rendering systems which may be deployed across one or more devices including servers and client devices. The rendering systems may operate in a cooperative fashion with little or no established hierarchy. The rendering system includes a controller module and an assembler module. Additional modules such as a view module, data module, event module, and so forth may also be present.

The controller module is configured to accept requests for content, or information based on those requests, and generate a strategy for rendering the content. The controller module accesses declarative data and uses one or more selectors to process information in the request using the declarative data and determine a strategy about the content to be rendered. The controller module in one rendering system may send inquiries to other controller modules, and receive back declarative data.

The controller module determines one or more jobs based on the determined strategy and passes these jobs to the assembler module. The assembler module is configured to coordinate performance of the jobs by scheduling, ordering, optimizing, and so forth. The assembler module is configured to provide assembler feedback to the controller module, which is indicative of the status of the jobs. Based on the assembler feedback, the controller module may modify the strategy and the operation of the assembler module, make inquiries for declarative data, and so forth. The feedback between the controller module and the assembler module allows the rendering system to be reactive to changes in the declarative data describing the rendering. For example, as additional declarative data is received and determined, new jobs may be created, existing jobs may be canceled, and so forth.

Furthermore, because of the comparatively loose binding between the modules in the rendering system, the assembler module may direct various jobs to be executed concurrently, avoiding the blocking problems of traditional platforms and reducing time to generate the rendered content. For example, the assembler module may direct a job to begin generating a view of a webpage which includes non-user specific elements while data is retrieved for user-specific content, such as particular product recommendations.

The rendering systems operate in concert with one another using the declarative data expressed in the same declarative language. As a result, an administrator or other party may easily modify operation of a particular rendering system or the entire platform by changing declarative data. The rendering platform as a whole may be implemented as a decentralized distributed system with little or no hierarchy between the individual rendering systems. As a result, the rendering platform is not subject to outages resulting from failure of a central authoritative system. Furthermore, the rendering platform may be highly resistant to failure of individual rendering systems. For example, inoperability of a particular rendering system may impact the delivery of a particular portion of the rendered content, but the user may still receive some content.

In certain circumstances, some hierarchy may be established between the rendering systems. For example, a server implementing a bootstrap module may provide initial configuration details to a rendering system which comes online. Inquiries for declarative data or other information may be directed to this server, to other servers, or to a combination thereof.

By defining different pieces of declarative data, a single platform may provide rendered content for different entities, domains, and so forth. For example, a single platform may provide dynamic content to users for many different domains having different content, business rules, and so forth. This improves overall utilization of the platform resources which may reduce costs. Flexibility provided by the use of the common declarative language and the loose binding between the modules of the rendering system eases development, deployment, and maintenance. Additionally, the flexibility may allow for easier customization of the rendered content to a particular user and a reduction in time to deliver the rendered content which improves the overall experience of the user.

FIG. 1 illustrates an architecture 100 including dynamic web platform. A rendering platform 102 is depicted, which may be made up of one or more servers 104(1), 104(2), . . . , 104(S). The servers 104 are described in more detail below with regard to FIG. 6. The rendering platform 102 may exist in one or more geographic locations. For example, the rendering platform 102 may comprise servers 104 at datacenters at different locations, edge servers, point-of-presence servers, and so forth. The rendering platform 102, or the servers 104 or other devices therein, are configured to couple to one or more networks 106. The one or more networks 106 may be public, private, or a combination of public and private. In one implementation the network may be the Internet.

Coupled to the network 106 are one or more client devices 108. The client devices 108 may include televisions, tablet computers, smartphones, personal computers, electronic book ("eBook") readers, gaming consoles, set-top boxes, portable media players, servers, and so forth. The client device 108 is discussed in more detail below with regard to FIG. 7. The client device 108 may communicate with the servers 104 or other devices in the rendering platform 102 by way of the network 106.

Executing on one or more of the servers 104 are one or more rendering systems 110(1), 110(2), . . . , 110(R). The rendering system 110 provides at least a portion of the functionality of dynamically generating content. The rendering system 110 may be envisioned as a "stack" of modules. In some implementations the rendering system 110 may execute as a single thread.

The modules may either be discrete with each performing a particular set of one or more functions, or may be merged in various combinations. The rendering system 110 may include one or more of a controller module 112, an assembler module 114, a view module 116, a data module 118, and an event module 120. For example, as shown here the rendering system 110(1) may include all of these modules, while the rendering system 110(2) may contain only the controller module 112 and the assembler module 114. These modules may be written in a variety of languages, including imperative or procedural languages such as Java, C, C++, Fortran, and so forth. One or more modules in the system may implement one or more machine learning techniques for use in operation. These machine learning techniques may include a neural network, Bayesian network, and so forth. For example, the controller module 112, the assembler module 114, and so forth may use machine learning techniques to modify operation based at least in part on ongoing inputs and operating characteristics such as latencies, processing requirements, memory requirements, bandwidth requirements, and so forth.

The rendering system 110 includes or accesses declarative data 122 and other data 124 such as user information, product information, markup language, and so forth. When in operation, the rendering system 110 accepts a request 126, or information based on the request 126, and produces rendered content 128. For example, the client device 108 may send a request 126 using the network 106 to the rendering platform 102. The rendering platform 102 passes the request 126, or information based on the request 126, to the rendering system 110.

The rendered content 128 may include one or more of: executable script, markup language data, cascading style sheet ("CSS") data, image data, text data, binary data, audio data, or video data. For example, the rendered content 128 may include JavaScript, hypertext markup language ("HTML") files, pictures, and so forth.

The modules of the rendering system 110 may be considered loosely bound to one another, as compared to being tightly bound. Modules which are tightly bound to one another are closely interconnected. As a result, changes to one may impact another. Tight binding may be expressed as a condition where modules are interconnected more than necessary to function. For example, a first module may be considered tightly bound when the first module requests all fields in a table from a second module, when only one of those fields is actually used by the first module.

In comparison, loosely bound modules are less interconnected. Changes to one module need not impact another module. As a result, the loosely bound modules may be expressed as being interconnected just enough to function. Continuing the example, when the first module is loosely bound to the second module the first module requests from the table only the single field actually used. Other changes to the table in the second module, such as adding fields, would not adversely impact the operation of the first module. Said another way, the loose binding may indicate that respective inputs and outputs of one module are coupled to another module such that functionality between modules is maintained after modification of one or more modules.

By loosening the binding between modules, various benefits may be realized. Some functions in the modules may be performed concurrently, reducing overall elapsed time to deliver the rendered content 128. Changes to one module are less likely to impact other modules, reducing development complexity and costs.

The controller module 112 receives the request 126 and begins processing. The request 126 may include some information such as network address of the client device 108, a particular uniform resource locator ("URL") which the request 126 is intended for, and so forth. The controller module 112 accesses the declarative data 122 and begins processing the request 126 using this declarative data 122. The controller module 112 is described briefly below, and in more detail with regard to FIG. 2.

The declarative data 122 includes expressions which are indicative of one or more of business rules, operational parameters, and so forth. For example, the business rules may specify that particular domain names such as "a.com" and "b.com" are supported by the rendering platform 102, or designate a particular sales tax module to be used. Similarly, the operational parameters may specify how to distribute processing loads across the servers 104 in the rendering platform 102. The expressions in the declarative data 122 implement a declarative language.

The declarative language allows a user 132 such as an administrator 134 to designate an outcome without specifying how to achieve that outcome. In some implementations, the declarative data 122 may specify one or more operations without explicitly defining a sequence of performing the one or more operations. In this way, the declarative language differs from imperative languages such as Java, C++, C. For example, the declarative data 122 may specify "ACCEPT REQUEST FROM *.A.COM, RENDER CONTENT FOR *.A.COM". By implementing the use of the declarative data 122 based on a declarative language to configure the behavior of the rendering platform 102, the administration of the rendering platform 102 may be made simpler. For example, responsibility for generating or modifying the declarative data 122 may be taken over by individuals which are operationally closer to a particular business unit, rather than handing off to a programmer familiar with Java. The declarative data is described in more detail below with regard to FIG. 4.

The controller module 112 uses the declarative data 122 to build a strategy as to how to satisfy the request 126. The building of the strategy may be based at least in part on one or more machine learning techniques. For example, the controller module 112 may learn based on previous strategies and their outcomes to predict certain behaviors, modify operation to account for anticipated constraints such as limitations on network bandwidth, and so forth. In some implementations the controller module 112 may require additional declarative data 122 to complete the request 126. As a result, the rendering system 110(1) may inquire of other rendering systems 110(R) for additional declarative data 122. Continuing the example, the rendering system 110(1) may request more detail about what "RENDER CONTENT FOR *.A.COM" entails. The rendering system 110(1) may send an inquiry to rendering system 110(2) which may return declarative data 122(2) indicating "IF TODAY=HOLIDAY THEN SHOW HOLIDAY BANNER". The acquisition of this declarative data 122 may be recursive, in that many rendering systems 110 may be implicated to gather the declarative data 122. In some implementations the declarative data 122 may be locally stored or cached by the rendering system 110 to reduce the frequency of inquiries.

Once the controller module 112 has built a strategy to begin satisfying the request 126, the controller may send one or more jobs or data indicative of jobs to the assembler module 114. The assembler module 114 is responsible for initiating the execution, coordinating, scheduling, sequencing, terminating, and so forth of the jobs. The operation of the assembler module 114 may be based at least in part on one or more machine learning techniques, such that operation of the assembler module 114 is adaptive to changing conditions in the rendering platform 102. For example, based on particular jobs, the assembler module 114 may predict particular blocking events and adjust the sequencing of the jobs to proactively avoid or minimize these blocking events. Because the machine learning is automated, the assembler module 114, and thus the overall rendering platform 102, is able to be responsive to changes without the need for human intervention. The assembler module 114 may be configured to optimize the jobs by consolidating redundant jobs and so forth. Because of the loose binding between the modules, some of the one or more jobs may be executed concurrently, may be executed before all of the data needed by the job is available, and so forth.

The assembler module 114 may send the jobs to the other modules in the rendering system 110, such as the view module 116, the data module 118, the event module 120, and so forth. As described above, in some situations the jobs may be executed by different modules concurrently.

The view module 116 is configured to generate a user interface, or data which may be configured to generate a user interface when processed by the client device 108. This user interface may be expressed as one or more markup language data files, cascading style sheets ("CSS"), script such as JavaScript, and so forth. For example, the view module 116 may be configured to generate JavaScript which, when executed by the client device 108 provides an interactive control.

The data module 118 is configured to perform one or more data operations. These data operations may include retrieving data, writing data, modifying data, transforming data, and so forth. For example, the data module 118 may be configured to query a database management system to store user input.

The event module 120 is configured to perform one or more of logging data, generating metrics, issuing alerts, and so forth. For example, the event module 120 may be configured to, responsive to a job, enter a log entry into a log data file indicating that a particular job has been performed. In another example, the event module 120 may generate metrics such as a number of transactions processed per second, store processor usage details, and so forth.

One or more of the modules of the rendering system 110 may be configured to generate telemetry data 136. For example, the controller module 112 may be configured to generate telemetry data 136. The telemetry data 136 may comprise information indicative of the operation of the modules, the rendering system 110, hardware, and so forth. The telemetry data 136 may be exchanged between the rendering systems 110, or other devices. For example, the telemetry data 136 from the rendering systems 110 may be provided to an administrative server. The administrative server may use the telemetry data 136 to manage operation of the rendering platform 102.

As described above, responsive to the request 126, one or more of the rendering systems 110 produce the rendered content 128. The rendered content 128 may comprise one or more files which are configured to present information or support other actions on the client device 108. The rendered content 128 may be sent by the rendering platform 102 by way of the network 106 to the client device 108. The client device 108 includes an application module 130. The application module 130 is configured to accept the rendered content 128. The application module 130 may be configured to present output, receive input, and so forth, based at least in part on the rendered content 128.

In one implementation the rendering system 110 may extend to the client device 108. In this implementation, the rendering system 110, or a subset thereof, may be operable on the client device 108. Prior to sending the request 126, the local rendering system 110(L) may be configured to process the request 126, and work in conjunction with other rendering systems 110(R) in the rendering platform 102 to produce the rendered content 128.

Figure 2:
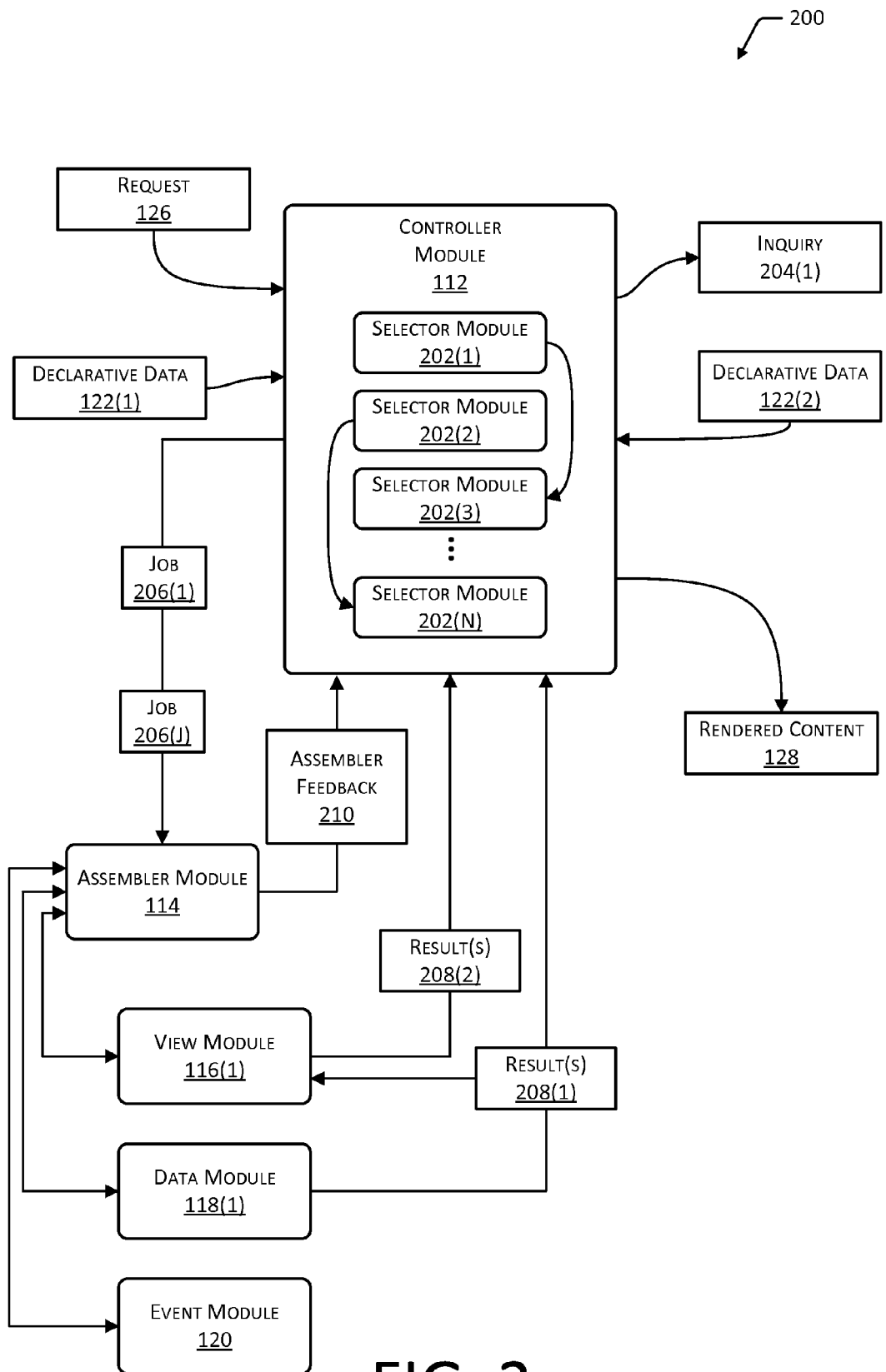
FIG. 2 is a block diagram of the controller module interacting with other modules.

FIG. 2 is a block diagram 200 of the controller module 112 interacting with the assembler module 114 and other modules. The controller module 112 may include one or more selector modules 202(1), 202(2), . . . , 202(N). The selector module 202 is configured to parse the declarative data 122 to implement business logic, control logic, or both. This parsing may be based at least in part on the request 126, or information therein.

Different selector modules 202 in the controller module 112 may perform different parsing operations implementing different logic, which in turn are used to determine what is to be included in the rendered content 128. For example, the selector module 202(1) may be configured to gather information associated with rendering content based on an item identifier while the selector module 202(2) may be configured to select banner advertisements.

Figure 3:
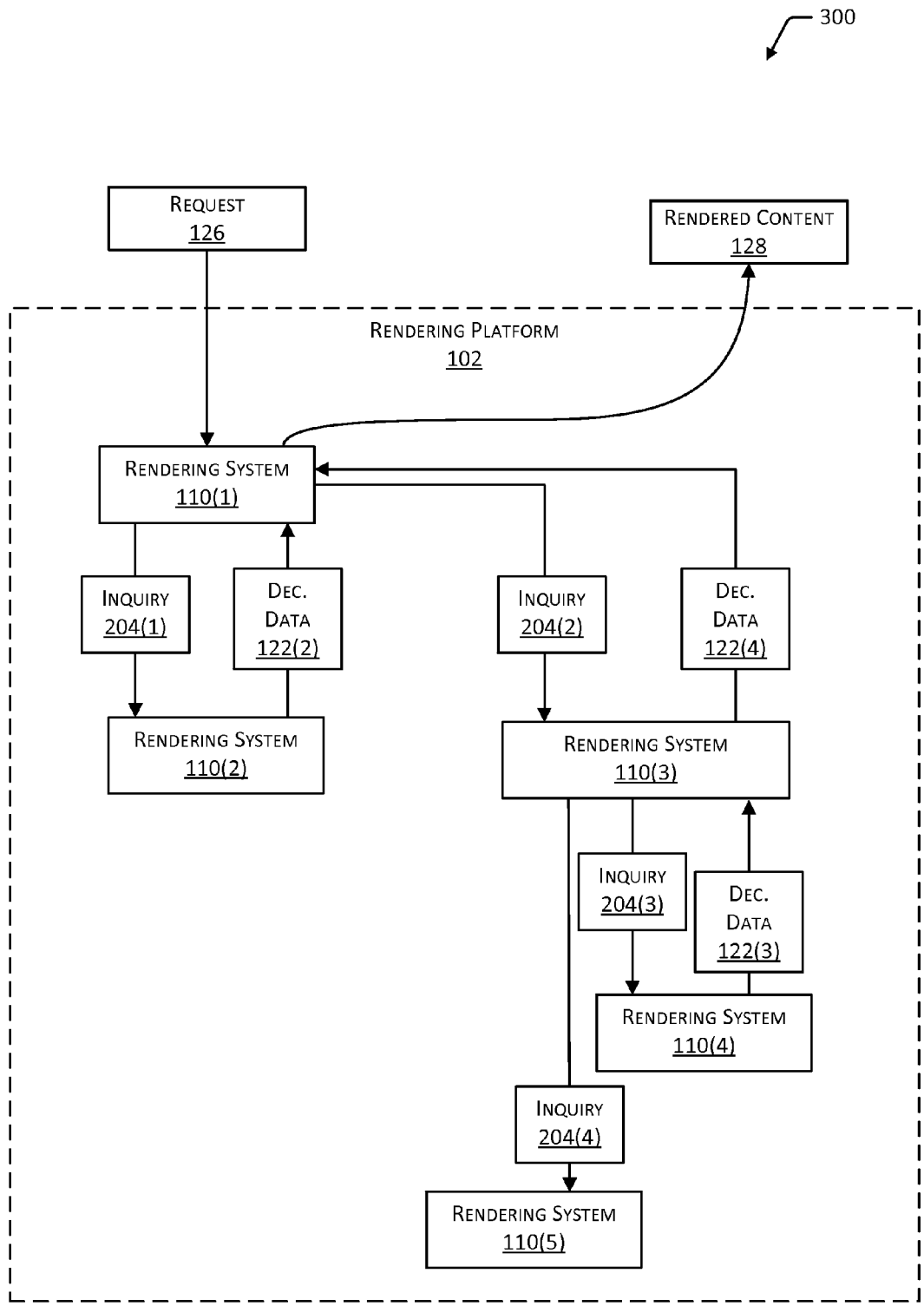
FIG. 3 is a block diagram of a rendering system inquiring and receiving declarative data from other rendering systems in order to provide rendered content.

In some situations, the controller module 112 may require additional declarative data 122. For example, additional details about how to present a particular piece of content may need to be gathered. The controller module 112 may issue one or more inquiries 204(1), 204(2), . . . , 204(Q). Other controller modules 112 may respond with additional declarative data 122. FIG. 3 below describes this situation in more detail.

The controller module 112 is configured to generate and send one or more jobs 206(1), 206(2), . . . , 206(J) to the assembler module 114. In some implementations the controller module 112 may send other data to the assembler module 114, which in turn generates the jobs 206.

The assembler module 114 receives the jobs 206 and is responsible for managing the operation of those jobs 206. The assembler module 114 may coordinate, schedule, initiate, terminate, and so forth the jobs 206. The assembler module 114 may be configured to process the jobs 206 by consolidating jobs 206 which result in the same data, terminating or not initiating jobs 206 which produce duplicative results, and so forth.

In one implementation the assembler module 114 may use one or more machine learning techniques to learn how to manage the jobs 206. The assembler module 114 may learn based on jobs 206 received using operational information such as blocking events, latencies, and so forth. In some implementations, the assembler module 114 may be initially configured with details about how to manage the jobs 206. However, over time, based on the experiences of the assembler module 114, the behavior of the assembler module 114 may be modified relative to the initial configuration, adapting to the changing needs of the rendering platform 102. In this way, instead of requiring programmers to manually update and manage operation of the assembler modules 114, ongoing operation of the assembler module 114 may be automated, removing the need for manual intervention.

The jobs 206, which may have been modified or generated by the assembler module 114, are sent to other modules for processing. Because of the loose binding between the modules, some of the jobs 206 may be executed concurrently. For example, the job 206 to generate a view of the basic web page may begin processing by the view module 116(1) while the data module 118(1) retrieves detailed information about a particular product. The data module 118(1) may send results 208(1) of that retrieval to the view module 116(1) and to the controller module 112. The one or more of the selector modules 202 of the controller module 112 may then use those results 208 to generate the rendered content 128, instantiate additional selector modules 202, and so forth. For example, the selector module 202(1), based on the declarative data 122(2), may call for additional filtering of the results 208(1). This filtering may invoke selector module 202(3) to perform this processing.

The assembler module 114 may be configured to provide assembler feedback 210 to the controller module 112. The assembler feedback 210 is information indicative of the status or progress of the jobs, or is otherwise indicative of the execution of the jobs 206. For example, the assembler feedback 210 may indicate that a particular job 206 has reached a timeout limit, or has completed but is waiting for a blocking event such as another job 206 to finish. In some implementations, the assembler feedback 210 may be omitted, and the controller module 112 may use the results 208 themselves as the feedback.

As illustrated here, the controller module 112 and the assembler module 114 are coupled to one another in a feedback loop. As a result, the strategy of the controller module 112 and the jobs 206 which the assembler module 114 is processing may change from time to time. The strategy associated with responding to the request 126 may change as additional information in the form of declarative data 122, assembler feedback 210, and so forth, is received. This in turn may result in changes to the activity of the assembler module 114. As a result, the rendering system 110 is highly dynamic in operation. For example, as additional declarative data 122 is received from other controller modules 112, the information about the rendered content 128 may continue to be refined and focused. While that refinement is occurring, jobs 206 which have become unnecessary due to changing information are terminated while new jobs 206 are initiated.

The operation of the rendering system 110 may reduce a quantity of data processed or cached. For example, the controller module 112 and the assembler module 114 may be configured to request and cache information which is actually implicated by the request 126 and declarative data 122. Compared to purely predictive caching, this may reduce the transfer and storage of cached data which may go unused. However, in some implementations the rendering system 110 may cache both data actually implicated as well as data predicted to be used. By reducing the amount of data transferred, stored, or otherwise processed, the rendering system 110 frees up resources for processing additional requests 126 or other tasks.

Operation of the rendering system 110 as described above significantly reduces blocking events and their impact. As a result, a time-to-first-byte-delivered responsive to the request 126 may be reduced from milliseconds to microseconds. For example, the rendering system 110 as described need not wait for operation of the data module 118 or other input/output bound actions to begin generating and providing at least a portion of the rendered content 128 to the client device 108. Additionally, the action of the controller module 112 and the assembler module 114 allows for the jobs 206 to be executed in parallel where possible, as described next in FIG. 3.

FIG. 3 is a block diagram 300 of the rendering platform 102 in which one rendering system 110 issues inquiries and receives declarative data 122 from other rendering systems 110 in order to provide the rendered content 128. As mentioned above, in some situations, a particular rendering system 110 may call for additional declarative data 122 which is stored in other rendering systems 110 or locations.

As shown here, the rendering system 110 accepts the request 126, or information based on the request. While processing the request 126, the controller module 112 determines additional declarative data 122 is called for. For example, the declarative data 122 may specify "RENDER CONTENT FOR *.A.COM" but may not provide details about exactly what is to be rendered. Lacking these details, the rendering system 110 may generate one or more inquiries 204 which are sent to other rendering systems 110 seeking declarative data 122 associated with rendering the content for the domain "*.A.COM". As shown here, the rendering system 110(1) may send inquiry 204(1) to the rendering system 110(2) and inquiry 204(2) to the rendering system 110(3).

The rendering system 110(2) accepts the inquiry 204(1). The rendering system 110(2) has some relevant declarative data 122(2), and returns this to the rendering system 110(1). The rendering system 110(3) accepts the inquiry 204(2), and responsive to the inquiry 204(2), generates additional inquiries 204(3) and 204(4) which are sent along to rendering system 110(4) and 110(5), respectively. The rendering system 110(4) sends declarative data 122(3) to the rendering system 110(3). However, the rendering system 110(5) does not respond to the inquiry 204(4), perhaps because no declarative data 122 is available. The rendering system 110(3) provides declarative data 122(4) to the rendering system 110(1). The declarative data 122(4) may be based on declarative data 122 stored on the rendering system 110(3), as well as the declarative data 122(3) which was received.

The rendering platform 102 may thus process the request 126 by having the rendering systems 110 in the platform 102 working in concert to gather declarative data 122 associated with the request 126. The rendering systems 110 operate in a collaborative and decentralized fashion in that no centralized administrative or authoritative system may be present. As a result, the rendering platform 102 or the components therein may be easily scaled to support higher or lower processing loads. Additionally, this improves fault tolerance by removing a single point of failure in the form of the centralized authority.

Given the distributed nature of the rendering platform 102, the user experience may vary should one of the rendering systems 110 fail to return declarative data 122. For example, when the rendering platform 102 is fully operational, the rendered content 128 may comprise a webpage which is highly customized to the particular user 132, including controls, advertisements, products, and details which have been tailored to be of greatest relevance to the user 132. Should one of the rendering systems 110 fail to return a particular piece of declarative data 122, the rendered content 128 would still be delivered, but may be slightly less specific to the user 132. For example, should the rendering system 110(5) fail to return declarative data 122 which defines how to present a particular product to a particular user 132, the rendered content 128 from the rendering system 110(1) may omit that particular product.

The operation of the rendered platform 102 may also be expressed in terms of an expansion of information based on the initial request 126. Based on information in the initial request 126, the processing by the rendering system 110 based on the declarative data 122 may expand this information into a detailed expression describing the user 132. For example, based on source Internet Protocol ("IP") address and a URL, the rendering platform 102 may be configured to generate data indicating:

That the request 126 is from user 132 "Alice Jones" at physical address "123 Main Street, Molson, Washington".

Ms. Jones has a history of purchasing one detective story a week in electronic format.

Ms. Jones purchases and reads her detective stories using an "Ignite" model eBook reader which has a color display.

Detective story purchases by Ms. Jones are delivered to her "Ignite" using a digital fulfillment system.

The purchase of these stories is made 90% of the time responsive to weekly banner ads for detective stories.

The weekly banner ads are placed on the introductory page to the "a.com" website between the hours of 12 p.m. and 1 p.m. local time on weekdays.

As described above, because the declarative data 122 is more easily manipulated by administrators 134, changes to the rendering platform 102 may be made by a variety of different parties responsible for maintaining the rendered content 128. For example, a business unit responsible with maintaining the banner ads may more readily change banner ads so Ms. Jones, and other similar users 132, may receive color banner ads which take advantage of the color display on the "Ignite" eBook reader.

Figure 4:
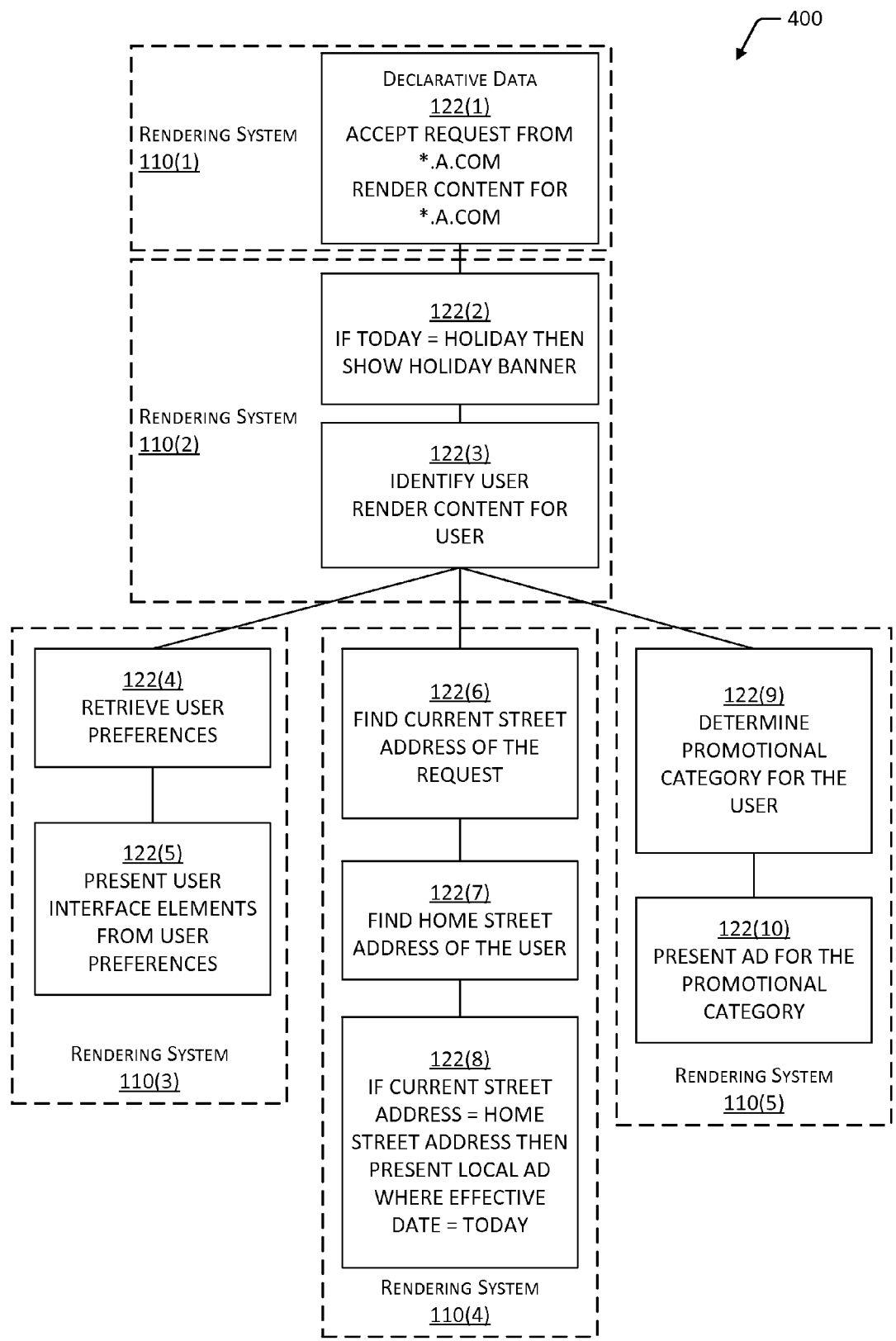
FIG. 4 illustrates declarative data as used by different rendering systems in the dynamic web platform to provide rendered content to the user.

FIG. 4 illustrates a graph 400 of declarative data 122 as used by different rendering systems 110 in the dynamic web platform 102 to provide the rendered content 128 to the user 132 of the client device 108. The declarative data 122 provides information about what is to be done by the rendering platform 102 responsive to receiving a request 126. The declarative data 122 uses a declarative language which contains expressions or instructions in a non-imperative form. For example, the declarative data 122 may express a desired outcome or result, rather than a particular flow of specific commands. In one implementation, the same declarative language is used throughout the rendering platform 102. The rendering systems 110 in the rendering platform 102 are configured to process the declarative data 122 consistently. As a result, the same declarative data 122 may be used by any of the rendering systems 110. The declarative data 122 passed from one rendering system 110 remains operable on another.

Additionally, the declarative data 122 associated with a particular entity, domain name, business, and so forth may be copied or transferred to another rendering platform 102. This allows for easy transfer to a different service provider, eases deployment, and so forth. For example, a business which operates a website selling shoes in the United States may copy the declarative data 122 associated with that website to a rendering platform 102 executing in France. That copy of the declarative data 122 may then be modified to account for the different business environment of France. As a result, the French website may be brought online more quickly by reusing at least some of the declarative data 122.

In the illustrative example of FIG. 4 declarative data 122(1)-(10) is distributed across rendering systems 110(1)-(5). Each piece of declarative data 122 contributes to the website to be supported by the rendering platform 102. For example, each piece is used to determine what and how the website is produced in the rendered content 128. For example, as shown here the declarative data 122(1) used by the rendering system 110(1) specifies that the rendering system 110 will respond to and render content for the domain "*.A.COM", where the asterisk acts as a wildcard. As described above with regard to FIG. 3, the rendering systems 110 may inquire and receive declarative data 122 from other rendering systems 110. As shown here, the rendering system 110(1) may have inquired and received the declarative data 122(2) and 122(3) from the rendering system 110(2) which provide for a holiday banner and identification of the user 132, respectively.

The rendering system 110(2) may in turn make inquiries for additional pieces of declarative data 122 as shown below. Continuing the example, the rendering system 110(3) may contain declarative information 122(4) and 122(5) which relates to user preferences and user interface elements. Meanwhile, the rendering system 110(4) may provide declarative data 122(6)-(8) which determines whether the request 126 comes from the identified user's 132 home address, and if the user 132 is home a local advertisement is presented.

As described above, the controller modules 112 of the rendering system 110 may be configured to parse and act on the request 126 based at least in part on the declarative data 122 available. In one implementation the declarative data 122 may be returned to the rendering system 110 for processing and generation of the rendered content 128.

In another implementation, the inquiry 204 may include data which the recipient controller modules 112 process according to the declarative data 122 stored locally. In this implementation, the processing and subsequent execution of the jobs 206 may be distributed across many different rendering systems 110.

Figure 5:
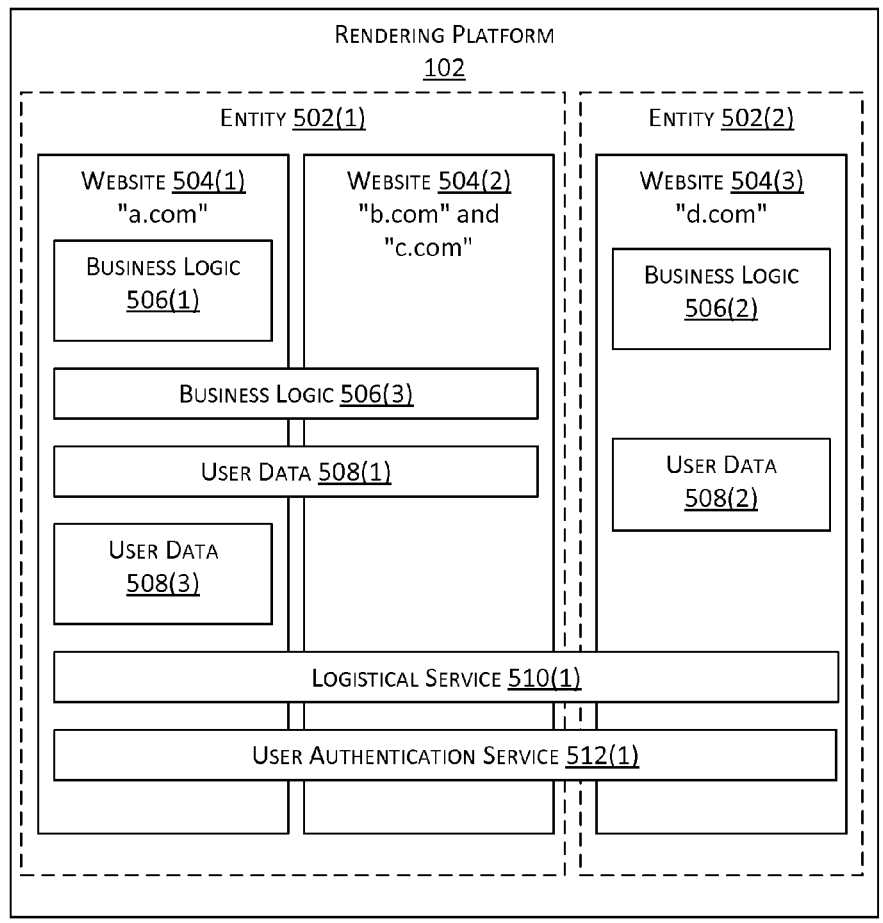
FIG. 5 is a block diagram of the rendering platform supporting different entities, websites, domains, and services.

FIG. 5 is a block diagram 500 of the rendering platform 102 supporting different entities, websites, domains, and services. As described above, the use of the declarative data 122 throughout the rendering platform 102 provides great flexibility in operation of the rendering platform 102 by simultaneously supporting multiple entities, multiple websites, and so forth. Each of these multiple websites may have declarative data 122 which describes how content is to be dynamically generated which differs significantly from other websites. For example, the rendering system 110(1) may include declarative data 122 for the website "a.com" and for "d.com", which are associated with completely different entities.

The rendering platform 102 may support different entities 502 at the same time. For example, as shown here entity 502(1) and entity 502(2) coexist within the same rendering platform 102. In this example, entity 502(1) may be an online merchant while entity 502(2) is an organization such as a food bank.

The entity 502 may provide content associated with one or more websites 504. The websites 504 operated by the entity 502 may have different functionality, different look and feel, and so forth. For example, the entity 502(1) may operate the website 504(1) for selling books and another website 504(2) for selling shoes. Furthermore, each website 504 may have a different network name, such as a domain name. Based on which domain the user 132 accesses, different rendered content 128 may be provided. For example, the shoe website 504(2) may provide the "b.com" domain localized for users in the United States while the "c.com" domain is localized for users in the United Kingdom. Both may present the same inventory, but sizing, prices, and so forth may vary between the two.

Business logic 506 comprises the rules with which the rendered content 128 is generated. This may include decision logic as to how ads are presented, what sales are shown, how prices are calculated, and so forth. Some business logic 506 may be specific to a particular website 504 or even domain. For example, as shown here the website 504(1) may have business logic 506(1) designed for recommending books for readers in the United States. Likewise, the website 504(3) may have business logic 506(2) which is designed to help users sign up for services offered by the food bank.

Some business logic 506(2) may be common across at least a portion of the rendering platform 102. For example, the business logic 506(3) which provides shopping cart functionality may be used in both the websites 504(1) and 504(2). However, since the food bank does not provide shopping cart functionality, this business logic 506(3) is not available to the website 504(3).

Likewise, user data 508 such as user account information, preferences, and so forth, may be maintained and used in the rendering platform 102. For example, the entity 502(1) may have common user data 508(1) available across both websites 504(1) and 504(2). In comparison, entity 502(2) maintains separate user data 508(2).

Other functions may also be distributed within the rendering platform 102. For example, logistical services 510 for the physical delivery of goods and user authentication services 512 may be used by all the websites 504(1)-(3).

However, as needs of the entities 502, websites 504, domains, administrators 134, and users 132 change, the rendering platform 102 may be readily adjusted by modifying the declarative data 122. For example, should a new shipping carrier become available, a change in the declarative data 122 associated with the logistical service 510 may make this additional freight carrier available to all users 132 of the rendering platform 102. Likewise, should a particular entity 502(1) wish to cease using a particular freight carrier, the administrator 134 for that entity 502 may readily edit the declarative data 122 to exclude use of that carrier.

Permissions may be implemented in the rendering platform 102. These permissions may control which declarative data 122 may be modified by an administrator 134, and how. For example, the administrator 134(1) authorized by the entity 502(1) may be allowed to make changes to the declarative data 122 for websites 504(1)-(2), but not to website 504(3) which is controlled by administrator 134(2).

Subject to the permissions implemented, changes to the declarative data 122 may be range in scope from very narrow to encompassing the entire rendering platform 102, and may be configured to operate across entities 502, websites 504, and so forth. For example, declarative data 122 may specify that user 132(1) does not like animated advertisements presented on his tablet client device 108(1), but does like animated advertisements on any other client device 108(2)-(D) he may use. As a result, regardless of which website 504 the user 132 accesses which is provided by the rendering platform 102 implementing that rule, he would never see an animated advertisement on his tablet client device 108(1). In comparison, updates to the declarative data 122 may allow for all rendered content 128 provided by the rendering platform 102 to use a new function available in the application module 130.

Figure 6:
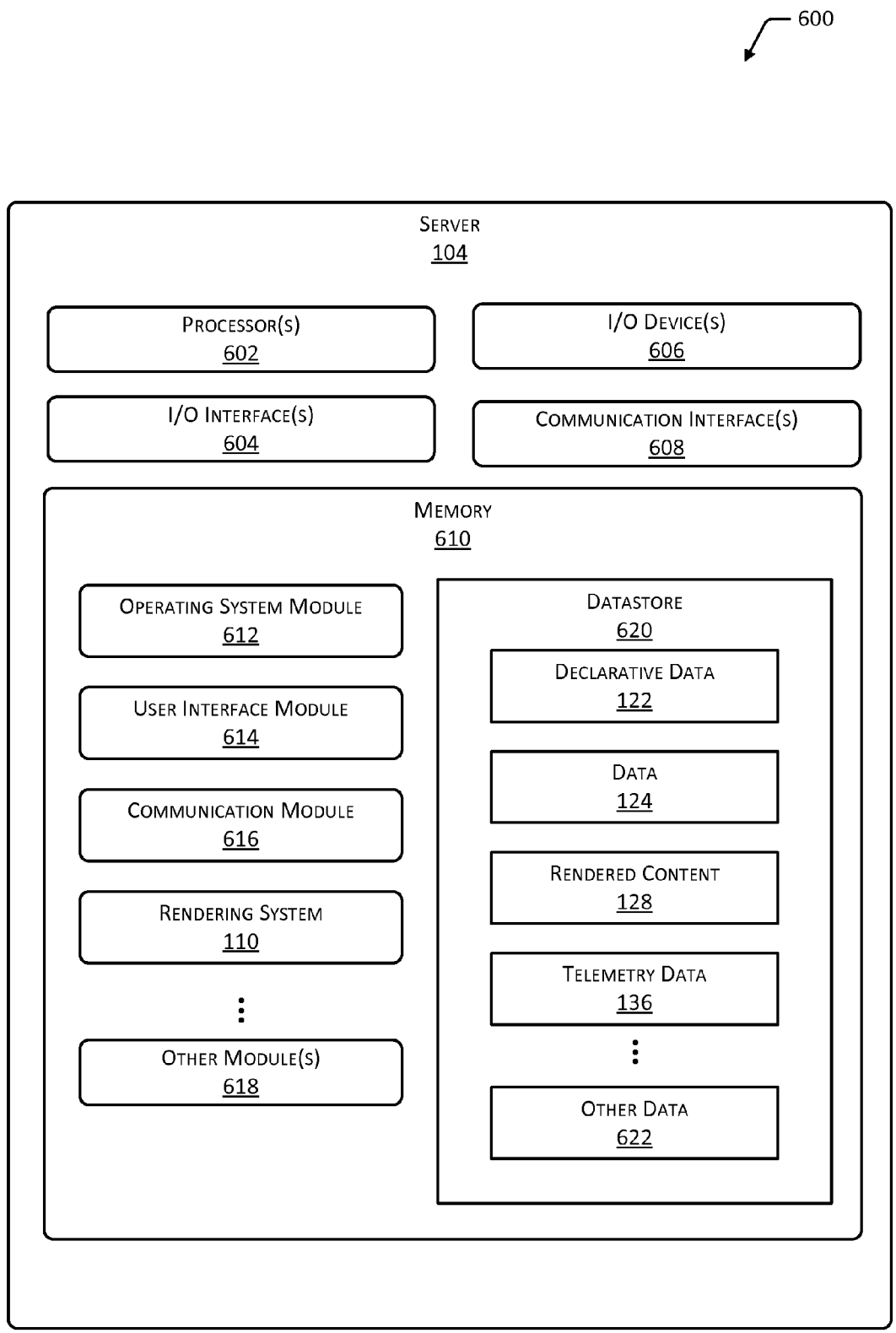
FIG. 6 illustrates a block diagram of a server configured to support the rendering system.

FIG. 6 illustrates a block diagram 600 of one of the servers 104 configured to support the rendering system 110. One or more servers 104(S) may execute one or more of the rendering systems 110(R). The server 104 may include one or more processors 602 configured to execute one or more stored instructions. The processors 602 may comprise one or more cores. The server 104 may include one or more input/output ("I/O") interface(s) 604 to allow the processor 602 or other portions of the server 104 to communicate with other devices. The I/O interfaces 604 may comprise inter-integrated circuit ("I2C"), serial peripheral interface bus ("SPI"), Universal Serial Bus ("USB") as promulgated by the USB Implementers Forum, RS-232, and so forth.

The I/O interface(s) 604 may couple to one or more I/O devices 606. The I/O devices 606 may include input devices such as one or more of a keyboard, sensors, and so forth. The I/O devices 606 may also include output devices such as one or more of a display, printer, and so forth. In some embodiments, the I/O devices 606 may be physically incorporated with the server 104 or may be externally placed.

The server 104 may also include one or more communication interfaces 608. The communication interfaces 608 are configured to provide communications between the server 104 and other devices such as other servers 104, the client devices 108, routers, access points, and so forth. The communication interfaces 608 may include devices configured to couple to one or more networks 106 including local area networks, wide area networks, and so forth.

The server 104 may also include one or more busses or other internal communications hardware or software that allow for the transfer of data between the various modules and components of the server 104.

As shown in FIG. 6, the server 104 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for the operation of the server 104.

The memory 610 may include at least one operating system ("OS") module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A user interface module 614 is configured to provide the user interface to the administrators 134 or other users 132. For example, the user interface module 614 may implement an application programming interface ("API"), web interface, and so forth which allows the administrator 134 to modify the declarative data 122.

A communication module 616, is configured to support communication between the servers 104, the client devices 108, and so forth using the network 106. For example, the communication module 616 may implement a transmission control protocol/internet protocol ("TCP/IP") stack for communication.

The server 104 may implement one or more of the modules present in the rendering system 110 described above. For example, the server 104 may include the controller module 112, the assembler module 114, the view module 116, and the data module 118.

Other modules 618 may also be present. For example, a digital rights management module may provide support for presenting or processing content which is protected using one or more digital rights management schemes.

The memory 610 may also include a datastore 620 to store information. The datastore 620 may use a flat file, database, linked list, tree, executable code, or other data structure to store the information. In some implementations, the datastore 620 or a portion of the datastore 620 may be distributed across one or more other devices including servers, network attached storage devices, and so forth.

As depicted here, the datastore 620 may store one or more of the declarative data 122, data 124 such as images, text, or audio files, or rendered content 128. Other data 622 may also be stored. For example, the other data 622 may include administrator permissions, configuration files, and so forth.

Figure 7:
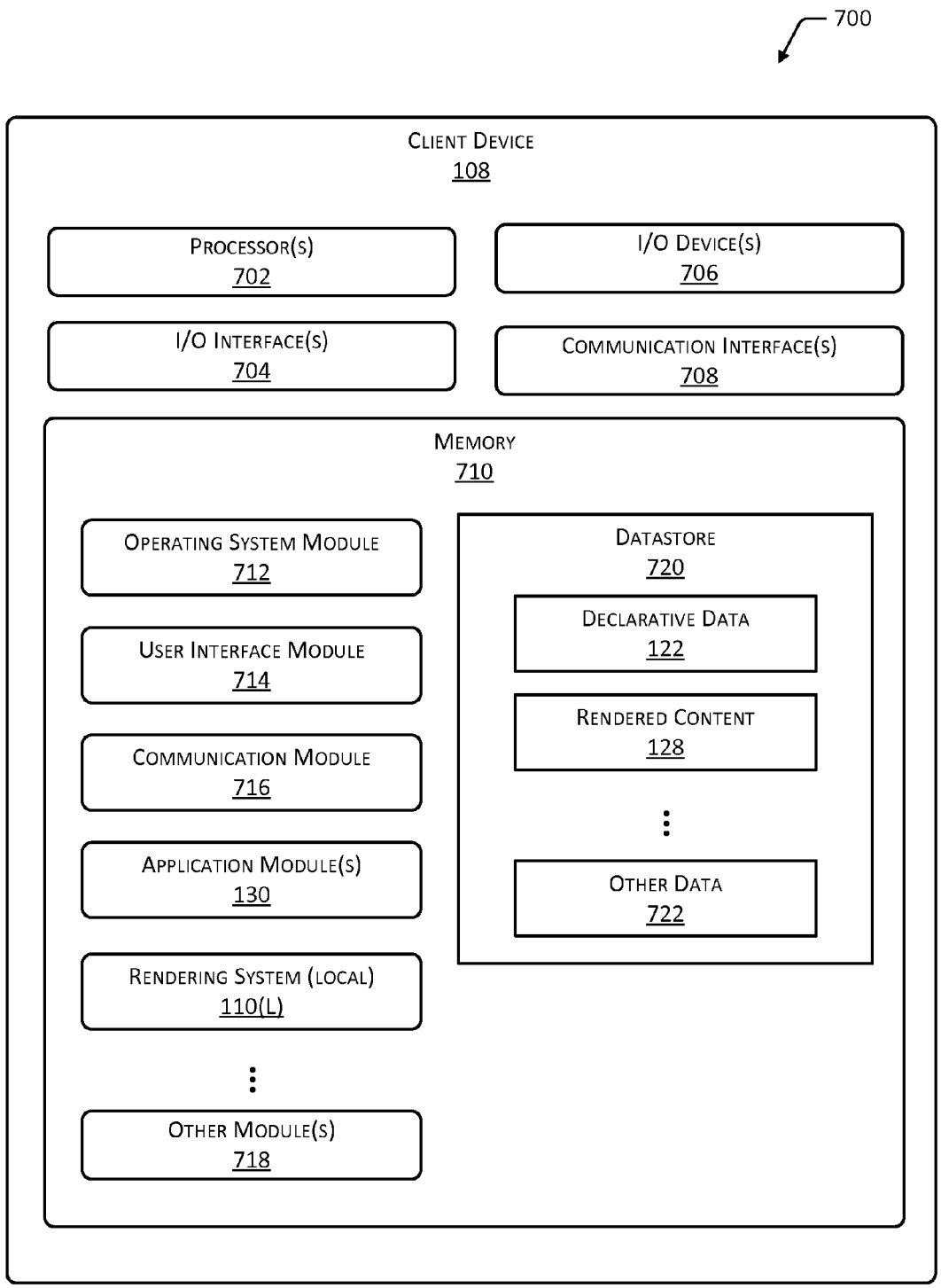
FIG. 7 illustrates a block diagram of a client device configured to present the rendered content, and which may also include one or more portions of the rendering system.

FIG. 7 illustrates a block diagram 700 of the client device 108 configured to present the rendered content 128, and which may also include one or more portions of the rendering system 110. While the client device 108 is depicted and discussed below with regard to a standalone device, in some implementations the client device 108 or functionality associated with the client device 108 may be implemented at least in part on one or more server devices. For example, the application module 130 may implement a distributed rendering model in which at least a portion of the processing of the rendered content 128 occurs in conjunction with an external server.

The client device 108 may include one or more processors 702 configured to execute one or more stored instructions. The processors 702 may comprise one or more cores. The client device 108 may include one or more I/O interface(s) 704 to allow the processor 702 or other portions of the client device 108 to communicate with other devices. The I/O interfaces 704 may comprise I2C, SPI, USB, RS-232, and so forth.

The I/O interface(s) 704 may couple to one or more I/O devices 706. The I/O devices 706 may include input devices such as one or more of a camera, a microphone, a touch sensor, a button, and so forth. The I/O devices 706 may also include output devices such as one or more of a display, audio speakers, haptic output devices, and so forth. The display may comprise an electrophoretic display, projector, liquid crystal display, interferometric display, light emitting diode display, and so forth. In some embodiments, the I/O devices 706 may be physically incorporated with the server 104 or may be externally placed.

The client device 108 may also include one or more communication interfaces 708. The communication interfaces 708 are configured to provide communications between the client device 108, routers, access points, servers, and so forth. The communication interfaces 708 may include devices configured to couple to one or more networks including personal area networks, local area networks, wide area networks, wireless wide area networks, and so forth.

The client device 108 may also include one or more busses or other internal communications hardware or software that allow for the transfer of data between the various modules and components of the client device 108.

As shown in FIG. 7, the client device 108 includes one or more memories 710. The memory 710 comprises one or more CRSM. The memory 710 provides storage of computer readable instructions, data structures, program modules, and other data for the operation of the client device 108.

The memory 710 may include at least one OS module 712. The OS module 712 is configured to manage hardware resource devices such as the I/O interfaces 704, the I/O devices 706, the communication interfaces 708, and provide various services to applications or modules executing on the processors 702. Also stored in the memory 710 may be one or more of the following modules. These modules may be executed as foreground applications, background tasks, daemons, and so forth.

A user interface module 714 is configured to provide a user interface on the client device 108. This user interface may comprise a graphical user interface, audible user interface, haptic user interface, or a combination thereof. The user interface module 714 is configured to process inputs, and provide corresponding outputs to the user 132, such as on the display.

A communication module 716 is configured to support communication with the servers 104, other client devices 108, routers, and so forth using the network 106. In some implementations the communication module 716 may implement the TCP/IP stack, and may also support encrypted communications. For example, hypertext transport protocol secured ("HTTPS") or transport layer security ("TLS") may be supported.

The memory 710 may also store an application module 130. The application module 130 is configured to accept the rendered content 128. The application module 130 may be configured to use the user interface module 714 to present output, receive input, and so forth, based at least in part on the rendered content 128. For example, the application module 130 may implement the WebKit engine as promulgated at www.webkit.org.

In some implementations, at least a portion of the rendering system 110 may be stored in the memory 710 and executed by the one or more processors 702. For example, the rendering system (local) 110(L) may include a controller module 112, an assembler module 114, a view module 116, and a data module 118. The rendering system (local) 110(L) is configured to operate and process declarative data 122 as described above. The rendering system (local) 110(L) may make inquiries 204 of the rendering systems 110 executing on the one or more servers 104(5).

The rendering system (local) 110(L) may provide performance enhancements by allowing for initial processing of the request 126 on the client device 108. For example, the declarative data 122 stored with the rendering system (local) 110(L) may specify that for a particular website 504 information about the current state of the memory, display, and processor of the client device 108 is required. When the rendering system (local) 110(L) is not available, the request 126 may be sent to the rendering platform 102 which then sends back a query to the client device 108 for this information. This may introduce significant delays and result in an adverse user experience. In comparison, the rendering system (local) 110(L) may use onboard declarative data 122 to ascertain that this information is requested, gather it, and then pass that information along to the servers 104 in the rest of the rendering platform 102. When combined with the concurrent operation of the jobs 206 facilitated by the loose binding between the modules of the rendering system 110, latency in providing the rendered content 128 to the user 132 may be significantly reduced.

The rendering system (local) 110(L) may be identical to the rendering system 110 on the servers 104. In some implementations, the rendering system (local) 110(L) may be configured to operate in the resource constrained environment of the client device 108.

Other modules 718 may also be present. For example, application modules to support email, word processing, calendaring, and so forth may be present.

The memory 710 may also include a datastore 720 to store information. The datastore 720 may use a flat file, database, linked list, tree, executable code, or other data structure to store the information. In some implementations, the datastore 720 or a portion of the datastore 720 may be distributed across one or more other devices including servers 104, network attached storage devices, and so forth.

As depicted here, the datastore 720 may store one or more of the declarative data 122 or the rendered content 128. Other data 722 may also be stored. For example, the other data 722 may include user preferences, configuration files, and so forth.

Figure 8:
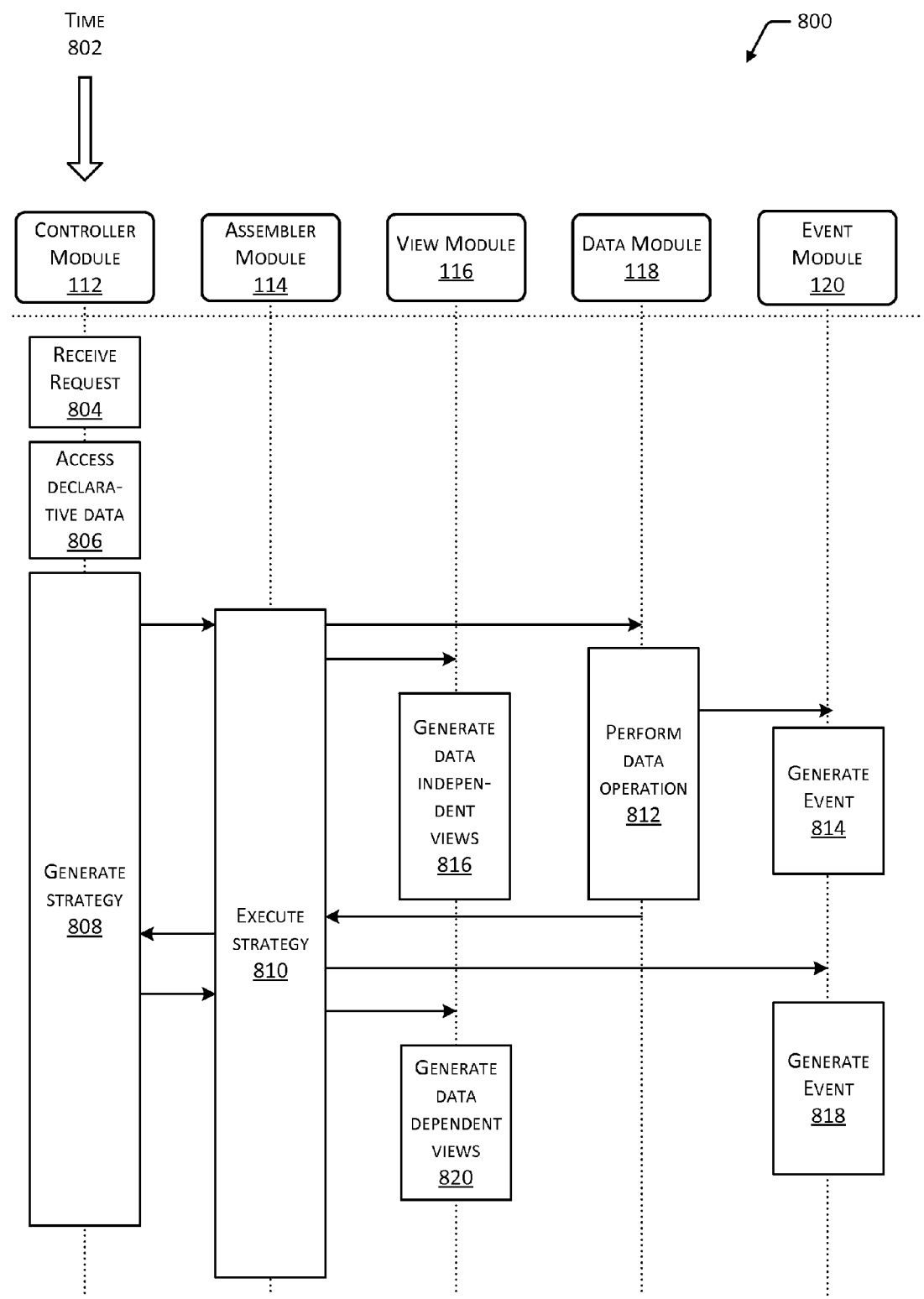
FIG. 8 illustrates data flow between the modules of the rendering system.

FIG. 8 illustrates a flow of data 800 between the modules of the rendering system 110. In this illustration, time 802 increases down the page, as indicated by the arrow. As described above with regard to FIG. 1, in some implementations the modules may be operative on one or more rendering systems 110.

At 804, the controller module 112 receives the request 126. For example, the request 126 may be for a webpage containing dynamically generated content.

At 806, the controller module 112 accesses the declarative data 122. This may be declarative data 122 available locally, or may result from sending one or more inquiries 204 and receiving declarative data 122 in response.

At 808 the controller module 112 generates strategy based on the request 126 and the declarative data 122. The strategy is sent to the assembler module 114. At 810 the assembler module 114 begins executing the strategy by distributing one or more jobs 206 for processing. In one implementation, the assembler module 114 may be configured to schedule and initiate jobs 206 first which implicate data modules 118, event modules 120, and so forth, followed by jobs 206 which implicate the view modules 116. In this example, a job 206(1) is sent to the data module 118. At 812 the data module 118 receives the job 206(1) is received by the data module 118 which performs the data operation 812. For example, the data module 118 may retrieve, store, or transform data. As part of performance of the data operation 812, the data module 118 may send a job 206(2) to the event module 120 to generate an event 814 indicative of the data operation 812. For example, the event module 120 may maintain an audit log.

Returning to the assembler module 114, the strategy being executed at 810 may include generating one or more views which are not dependent on user-specific data. At 816, the view module 116 receives the job 206(3) from the assembler module 114 to begin creating the data independent view. For example, the view may include JavaScript which provides for standard navigation controls on a webpage.

Because of the loose binding between the modules, some jobs 206 may be performed concurrently. For example, as shown here at least a portion of the performance of the data operation 812, the event generation 814, and the generation of the data independent views 816 may be occurring concurrently with one another. This concurrency may decrease overall latency in delivering the rendered content 128 to the client device 108. In some implementations, the resulting view may then be passed to the client device 108 while the other operations are pending.

Continuing the example illustrated here, the assembler module 114 receives data back from the job 206(1) as performed by the data module 118. For example, the data operation 812 may have retrieved product detail information. As described above, the operation of the assembler module 114 and the controller module 112 may involve assembler feedback 210 which may result in a change in strategy. As shown here, the assembler module 114 may send assembler feedback 210 to the controller module 112. The controller module 112 may then send updated strategy to the assembler module 114. Meanwhile, the assembler module 114 may send a job 206(4) to the event module 120 to which generates another event 818.

As described above, the assembler module 114 may optimize or consolidate the jobs 206. For example, the job 206(1) may include several discrete queries to the data module 118 into one, avoiding the need to send queries for duplicative information. As a result, overall efficiency of the rendering system 110 is improved.

The assembler module 114, meanwhile, has received the updated strategy from the controller module 112 and sends a job 206(5) to the view module 116 to generate a data dependent view 820. For example, the data dependent view 820 may be based on the product detail information returned by the data operation 812. At 820, the view module 116 generates one or more data dependent views. For example, the view module 116 may create a portion of the webpage which will present product detail information and associated controls for manipulating that data.

As illustrated here, the various jobs 206 resulting from the controller module 112 and coordinated by the assembler module 114 may be performed at least in part concurrently. Because of the loose binding between the modules, some activities can be performed without blocking. For example, as shown here the generation of the data-independent views 816 may occur before the generation of the data dependent views 820.

Figure 9:
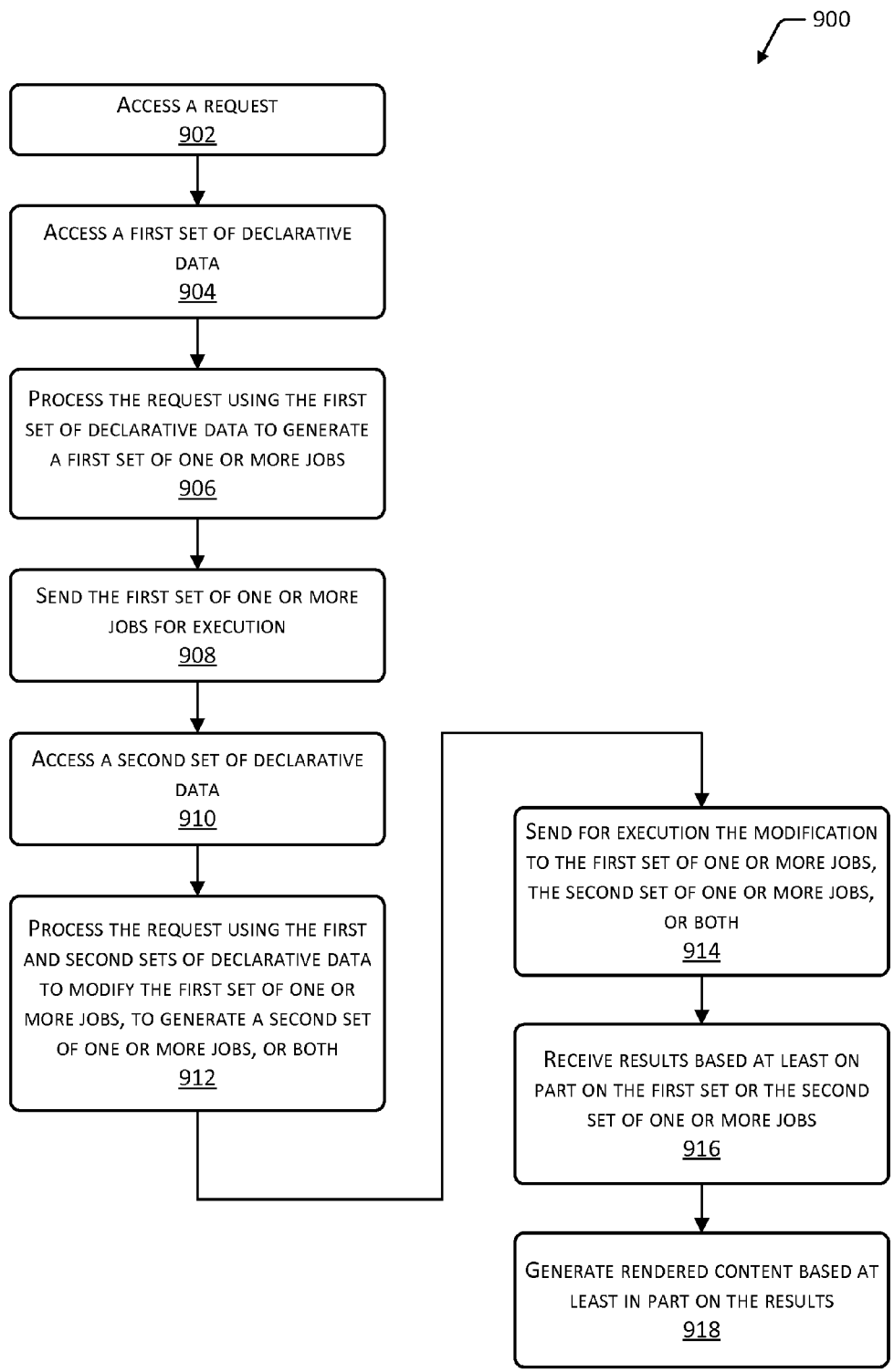
FIG. 9 is a flow diagram of a process of dynamically providing content using the rendering system.

FIG. 9 is a flow diagram 900 of a process of dynamically providing content using the rendering system 110. The process may be implemented at least in part by the controller module 112.

Block 902 accesses a request 126, or information based at least in part thereon. For example, the rendering system 110 may receive the request 126 or a dispatch based on the request 126. The access may include receiving the request 126 from a requestor, or a queue of pending requests 126.

Block 904 accesses a first set of declarative data 122(1). For example, the first set of declarative data 122 may have been previously acquired from one or more inquiries 204, as a result of a preload of data following initialization of the rendering system 110, and so forth. As described above, the declarative data 122 may comprise one or more expressions indicative of one or more of a business rule, an operational parameter of at least a portion of the system, and so forth. For example, these expressions may include text, numbers, symbols, and so forth which comprise the declarative language. The one or more expressions of the declarative language may specify one or more operations without explicitly defining a sequence of performing the one or more operations. For example, the declarative data 122 may state "RETRIEVE USER PREFERENCES", but does not explicitly define the steps involved in accessing the user preferences.

The declarative data 122 may include one or more expressions configured to recursively generate a plurality of inquiries 204 configured to retrieve, from a plurality of rendering systems 110 or other systems, additional declarative data 122. For example, the declarative data 122 may include references to additional declarative data 122 stored on another rendering system 110. These references may, in turn, refer to further declarative data 122.

Block 906 processes the request 126 using the first set of declarative data 122(1) to generate a first set of one or more jobs 206. These jobs 206 may use functionality in one or more view modules 116, data modules 118, event modules 120, and so forth.

Block 908 sends the first set of one or more jobs 206 for execution. For example, the first set of one or more jobs 206 may be sent from the controller module 112 to the assembler module 114.

Block 910 accesses a second set of declarative data 122(2). For example, the controller 118 may have issued one or more inquiries 204, or may receive unsolicited updates. In another example, the access to the second set of declarative data 122(2) may be based at least in part on the assembler feedback 210. For example, the assembler feedback 210 may indicate that additional information is necessary to complete the processing of a job 206. In yet another example, the access may be response to a job 206.

Block 912 processes the request 126 using the first 122(1) and second 122(2) sets of declarative data. The processing may modify the first set of one or more jobs 206, may generate a second set of one or more jobs 206, or both. For example, the strategy developed by the controller module 112 may be changed based on second set of declarative data 122(2).

Block 914 sends the modified first set of one or more jobs 206, the second set of one or more jobs 206, or both, to the assembler module 114. The assembler module 114 may then adjust, modify, consolidate, or generate additional jobs 206 based on this input. For example, one of the jobs 206 in the first set of one or more jobs 206 may be terminated, while the second set of one or more jobs 206 includes three new jobs 206 to be executed.

Block 916 receives results based at least in part on one or more of the first set or the second set of one or more jobs 206. For example, the results from the data module 118 may be received. In another implementation, the results may be returned to other modules, or to the client device 108. In some implementations, the process may iterate such that "s" number of sets of jobs 206 for execution and "d" number of sets of declarative data 122 may be processed, where "s" and "d" are nonzero integer values.

Block 918 generates, based at least in part on the results 208, rendered content 128. The rendered content 128 may include one or more expressions in a markup language. For example, the rendered content 128 may include a hypertext markup language ("HTML") file.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
a processor; and
a memory device communicatively coupled to the processor, the memory device storing instructions which when executed by the processor, cause the processor to instantiate a controller module to:
access a request for rendered content;
access a first set of declarative data;
generate a strategy for rendering content based on the request for the rendered content and the first set of declarative data;
process the request using the strategy using the first set of declarative data to generate a first set of one or more jobs;
generating a first set of one or more jobs for the strategy for the rendering of the content;
send the first set of one or more jobs to an assembler module;
access a second set of declarative data;
update the strategy for rendering the content based on the first and second sets of declarative data, the updated strategy for the rendering of the content including one or more of modifying the first set of one or more jobs and generating a second set of one or more jobs;
process the request for rendered content using the updated strategy for rendering the content based on the first and second sets of declarative data, the request for rendered content being processed using the updated strategy including one or more of the modified first set of one or more jobs and the second set of one or more jobs;
send one or more of the modified first set of one or more jobs and the second set of one or more jobs to the assembler module, the assembler module concurrently executing one or more of the modified first set of one or more jobs and the second set of one or more jobs;
receive results from the assembler module based at least in part on one or more of the first set of one or more jobs and the second set of one or more jobs executed by the assembler module concurrently; and
generate, based at least in part on the results, the rendered content.

2. The system of claim 1, wherein the declarative data comprises one or more expressions indicative of one or more of:
a business rule, or
an operational parameter of at least a portion of the system.

3. The system of claim 1, wherein the assembler module is coupled to the controller module, the assembler module executing the instructions to:
receive the first set of one or more jobs and the second set of one or more jobs from the controller;
initiate execution of the first set of one or more jobs and the second set of one or more jobs, wherein at least a portion of the first set of one or more jobs and the second set of one or more jobs are executed concurrently for at least a portion of time;
acquire information associated with the execution of the first set of one or more jobs and the second set of one or more jobs;
generate assembler feedback based at least in part on the acquired information;
send the assembler feedback to the controller module; and
the system further comprising:
a view module coupled to the assembler module and to:
receive one or more of the first set of one or more jobs and the second set of one or more jobs;
generate a user interface responsive to the one or more of the first set of one or more jobs and the second set of one or more jobs; and
generate results based on the user interface;
a data module coupled to the assembler module to:
receive one or more of the first set of one or more jobs and the second set of one or more jobs;
perform one or more data operations responsive to the one or more of the first set of one or more jobs and the second set of one or more jobs; and
generate results based on the one or more data operations;
wherein the access to the second set of declarative data is based at least in part on the assembler feedback.

4. The system of claim 3, wherein respective inputs and outputs of the controller module, the assembler module, the view module, and the data module are loosely bound to one another, such that functionality between modules is maintained after modification of one or more modules.

5. A computer-implemented method for dynamically rendering content, the computer-implemented method comprising:
receiving a request for content from a requestor;
accessing a first set of declarative data, wherein the first set of declarative data comprises one or more expressions configured to define processing of the request for content;
processing the request based at least in part on the first set of declarative data to generate rendered content;
based at least in part on the processing, requesting a second set of declarative data;
receiving the second set of declarative data;
further processing the request based at least in part on concurrently using the first set of declarative data and the second set of declarative data to further generate rendered content; and
sending the rendered content to the requestor.

6. The computer-implemented method of claim 5, wherein the one or more expressions specify one or more operations without explicitly defining a sequence of performing the one or more operations.

7. The computer-implemented method of claim 5, wherein the one or more operations are indicative of a business rule.

8. The computer-implemented method of claim 5, wherein the accessing the first set of declarative data comprises:
sending an inquiry to a device; and
receiving the first set of declarative data from the device.

9. The computer-implemented method of claim 5, wherein one or more of the first set of declarative data and the second set of declarative data comprise one or more expressions configured to recursively generate a plurality of inquiries configured to retrieve, from one or more systems, additional declarative data.

10. The computer-implemented method of claim 5, wherein the rendered content comprises one or more of:
executable script,
markup language data,
cascading style sheet data,
image data, text data,
binary data,
audio data, or
video data.

11. The computer-implemented method of claim 5, the processing the request comprising:
generating a plurality of jobs; and
initiating execution of the plurality of jobs, wherein at least a portion of the plurality of jobs are executed concurrently for at least a portion of time.

12. The computer-implemented method of claim 5, the processing the request comprising generating a view configured to generate a user interface.

13. The computer-implemented method of claim 5, the processing the request comprising one or more of: retrieving data, writing data, modifying data, or transforming data.

14. The computer-implemented method of claim 5, the processing the request comprising one or more of: logging data, or generating a metric.

15. The computer-implemented method of claim 5, wherein the method is executed as a single thread on a processing system.

16. A system comprising:
a first device comprising:
a first communication interface;
a first memory storing first computer-executable instructions; and
a first processor configured to couple to the first communication interface, access the first memory, and execute the first computer-executable instructions to:
receive a first request for rendered content;
access first declarative data;
based on the first request for rendered content and the first declarative data, generate a first set of one or more jobs to generate a first set of one or more results;
access second declarative data received from other devices in the system;
based on the first request for rendered content, the first declarative data and the second declarative data, generate one or more of a modified first set of one or more jobs and a second set of one or more jobs to generate a second set of one or more results;
initiate one or more of the modified first set of one or more jobs and the second set of one or more jobs concurrently using the first declarative data to produce the second set of one or more results; and
generate first output of rendered content based on the second set of one or more results.

17. The system of claim 16, the first computer-executable instructions further configured to:
generate a plurality of inquiries for declarative data;
send the plurality of inquiries to other devices in the system; and
receive from at least a portion of the other devices in the system declarative data responsive to the inquiries.

18. The system of claim 16, wherein the one or more jobs generate one or more scripts executed on a second device.

19. The system of claim 16, comprising:
a second device comprising:
one or more user input devices;
one or more user output devices;
a second communication interface configured to communicate with the first communication interface;
a second memory storing second computer-executable instructions; and
a second processor configured to couple to the one or more user input devices, the one or more user output devices, the second communication interface, access the second memory, and execute the second computer-executable instructions to:
generate the first request for rendered content;
send the first request for rendered content to the first device;
access third declarative data;
based on the first request for rendered content and the third declarative data, generate a third set of one or more jobs configured to generate a third set of one or more results;
initiate the third set of one or more jobs;
generate second output based on the third set of one or more results;
receive the first output from the first device; and
provide rendered content comprising the first output and the second output.

20. The system of claim 19, the second computer-executable instructions further configured to send at least a portion of the third set of one or more jobs to the first device.

* * * * *